Dec. 9, 1941. F. T. HARRINGTON ET AL 2,265,480
POWER TRANSMISSION
Filed Dec. 31, 1938 2 Sheets-Sheet 2
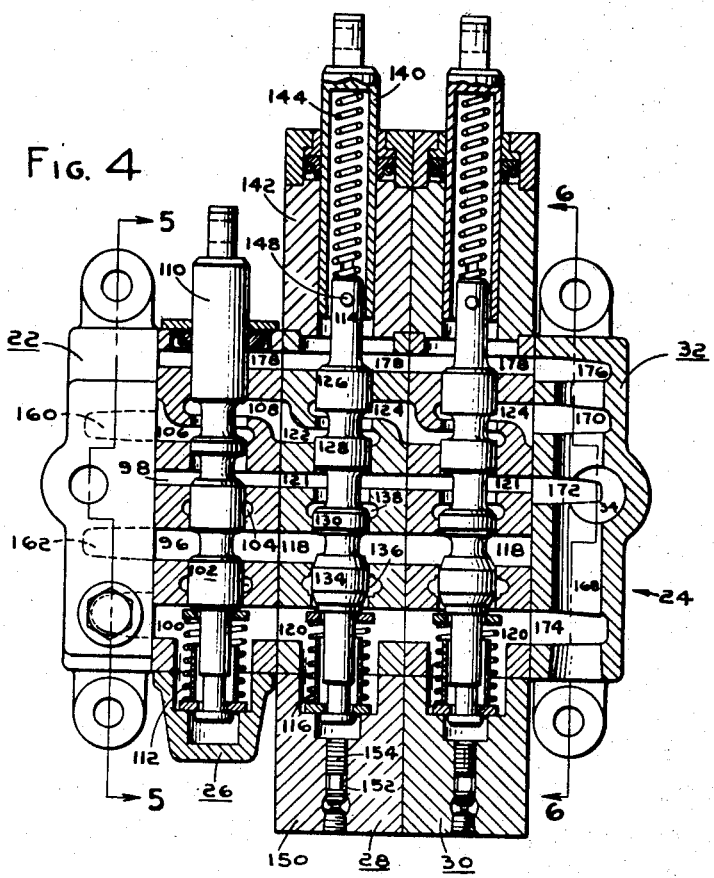
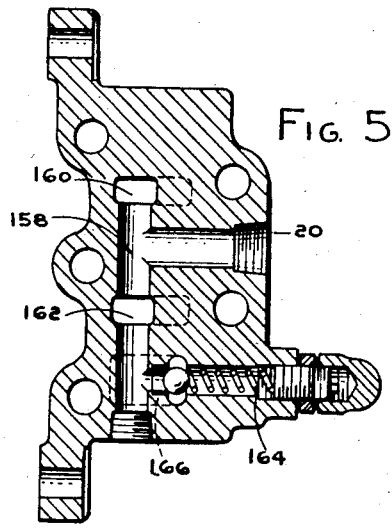
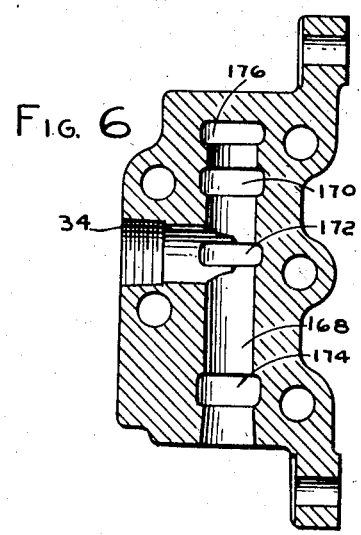
INVENTORS
FERRIS T. HARRINGTON &
DUNCAN B. GARDINER
BY
*Ralph L. Tweedale*
ATTORNEY Patented Dec. 9, 1941

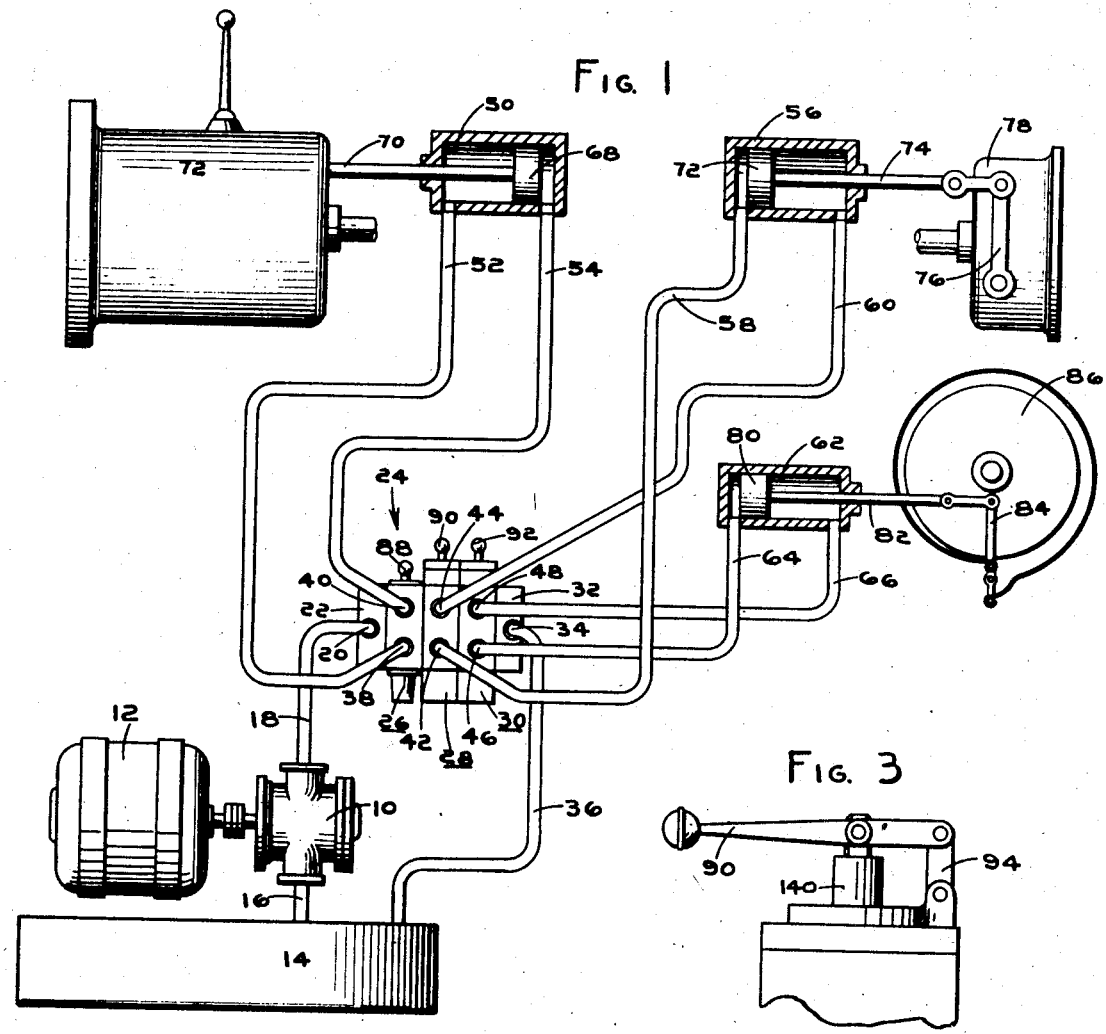
Fig. 1
Fig. 3
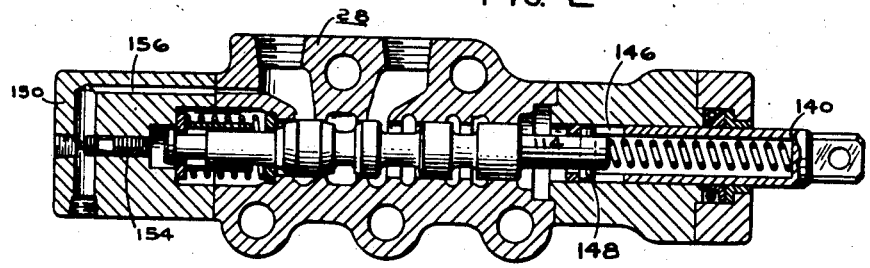
Fig. 2

2,265,480

UNITED STATES PATENT OFFICE 2,265,480

POWER TRANSMISSION

Ferris T. Harrington and Duncan B. Gardiner, Detroit, Mich., assignors to Vickers Incorporated, Detroit, Mich., a corporation of Michigan Application December 31, 1938, Serial No. 248,766

9 Claims. (Cl. 303—54)

This invention relates to power transmissions, particularly to those of the type comprising two or more fluid pressure energy translating devices one of which may function as a pump and another as a fluid motor.

The invention is particularly concerned with power transmission systems for operating clutches, brakes, and the like requiring greater effort than can be conveniently applied manually and wherein it is desirable to retain a "feel" in the operating handle which is similar to that of a direct manually operated clutch or brake.

In road and excavating machinery it is common to operate various shiftable parts of the mechanism which require large forces to move them by means of hydraulic cylinders supplied with power from a hydraulic pump. Frequently it is also desirable to operate one or more clutches or brakes also by hydraulic power, and for most satisfactory control of the device it is necessary that the operator be able to determine by the "feel" of the control handle the extent of engagement of the clutch or brake. It is also desirable to provide for rapid positive disengaging movement of the clutch or brake by hydraulic power.

As more particularly disclosed in the application of L. Raymond Twyman, Serial No. 202,294, filed April 15, 1938, for Multiple valve bank, it is also customary to provide a bank of control valves for controlling the various cylinders of a particular group or a machine which valve bank is made up of unit sections, one section for each cylinder, which sections are adapted to be mounted in side-by-side relation in such numbers and combinations as may be required in any given installation.

It is an object of the present invention to provide an improved power transmission system for operating a clutch, brake, or the like wherein the clutch or brake may be applied to a varying extent under complete operator control.

It is also an object to provide a system of the character described wherein the clutch or brake may be rapidly released by power, utilizing the full capacity of the hydraulic system.

It is a further object to provide an improved clutch or brake controlling valve for providing the above-described results and which is adapted to be incorporated in a multiple valve bank with any desired number or combination of other control valves similar to those described in the application above-mentioned.

Further objects and advantages of the present invention will be apparent from the following description, reference being had to the accompanying drawings wherein a preferred form of the present invention is clearly shown.

In the drawings:

Figure 1 is a diagrammatic view of a power transmission system embodying a preferred form of the present invention.

Figure 2 is a longitudinal cross section of a clutch or brake controlling valve forming a part of the circuit disclosed in Figure 1.

Figure 3 is a fragmentary view of the control valve disclosed in Figure 2.

Figure 4 is a cross section through the valve bank disclosed in Figure 1.

Figure 5 is a cross section on line 5—5 of Figure 4.

Figure 6 is a cross section on line 6—6 of Figure 4.

Referring now to Figure 1, there is shown a pump 10, which may be of the fixed displacement type and continuously driven by a prime mover such as an electric motor 12 to withdraw fluid from a tank 14 through a suction conduit 16 and deliver the same to a delivery conduit 18. The conduit 18 leads to a port 20 formed in the end plate 22 which forms part of a valve bank generally designated as 24. The latter in the example disclosed is made up of three valves 26, 28 and 30 and has a second end plate 32 at its right-hand end having a port 34 which is connected to the tank 14 by a conduit 36.

Each of the valves in the bank has a pair of cylinder ports designated as 38, 40, 42, 44, 46 and 48. The ports 38 and 40 connect to the rod and head ends respectively of a cylinder 50 by conduits 52 and 54. Ports 42 and 44 connect to the head and rod ends respectively of a cylinder 56 by conduits 58 and 60. Ports 46 and 48 connect with the head and rod ends respectively of a cylinder 62 by conduits 64 and 66.

The cylinder 50 has a piston 68 the rod 70 of which may be connected to a gear box 72 for shifting thereof between a forward and reverse connection. The cylinder 56 has a piston 72 therein the rod 74 of which may be connected to the operating lever 76 of a clutch 78. Cylinder 62 has a piston 80 therein the rod 82 of which may be connected to an operating lever 84 for a brake 86.

Each of the valves 26, 28 and 30 is provided with an operating handle 88, 90 and 92 for controlling the stem or spool of the valves.

As shown in Figure 3, lever 90 is pivotally mounted at one end to a link 94 which is pivoted to the body of the valve, and at its mid portion is pivotally mounted to the valve operating stem.

The internal construction of the valves 26, 28, and 30 is shown in Figure 4 in which it will be seen that each of the valves is provided with a longitudinal bore or recess in which the movable valve element or spool is slidable and with a plurality of transverse passages communicating with the central bore. These passages extend to the adjacent side faces of the valve units to form continuous passages running through the entire bank and registering with the various ports in the end plates 22 and 32.

The valve 26 is shown as a simple closed-center four-way valve similar to one disclosed in the copending application above referred to and per se forms no part of the present invention. Briefly the valve is provided with a transverse pressure passageway 96 and transverse tank passageways 98 and 100. The cylinder ports 38 and 40 connect with annular chambers 102 and 104 and are adapted to be selectively placed in communication, either one with the pressure passageway 96 and the other with one of the tank passageways 98 or 100 or vice versa. The valve also has an unloading passageway formed in two parts 106 and 108 which are normally in communication when the spool 110 is in the central position as illustrated. Whenever the spool is shifted either upwardly or downwardly to connect the cylinder ports to the pressure and tank passageways, the unloading passageway is blocked by the spool 110. Suitable spring centering means at 112 is provided for normally holding the valve spool in its center or neutral position.

The valves 28 and 30 are identical in construction so that only one of them need be described. The spool 114 is slidably mounted in the longitudinal spool receiving recess and is provided at its lower end with a spring centering means 116. The body is provided with a transverse pressure passage 118 and transverse tank passages 120 and 121 which correspond to the similar passageways in the valve 26. Likewise there is provided an unloading passageway in two parts 122 and 124 analogous to the unloading passageway in valve 26. The spool 114 is provided with lands 126, 128, 130, and 134 for controlling the various passageways. The cylinder ports 42 and 44 communicate with annular chambers 136 and 138 respectively.

The lands 130 and 134 are so arranged that in the center or neutral position shown both chambers 136 and 138 are in communication with the tank passageways 120 and 121 respectively. When the spool 114 is moved upwardly chamber 138 is blocked from the tank passageway 121 and placed in communication with the pressure passageway 118. At the same time chamber 136 remains in communication with the tank passageway 120. If the spool 114 be moved downwardly from the position shown chamber 136 is blocked from communication with the tank passageway 120 and placed in communication with the pressure passageway 118. The chamber 138 remains in communication with the tank passageway 121. When the valve spool is moved either upwardly or downwardly the unloading passageway is blocked by one or the other of the lands 126 and 128.

For operating the spool 114 there is provided at the upper end of the valve body a plunger 140 slidably mounted in an end cap 142 and receiving the upper end of a spring 144. The lower end of the spring abuts the top end of the spool 114. The plunger 140 is also provided with a pair of longitudinal slots 146 (see Figure 2) in which a pin 148 is received to provide a lost motion connection between the plunger 140 and the spool 114.

At the lower end of the spool there is provided in an end cap 150 a cylinder chamber 152 in which is slidably mounted a small piston 154. The latter, when raised, is adapted to abut the lower end of the spool 114 for lifting the same. The cylinder 152 is in communication with the cylinder port 42 and chamber 136 by means of a drilled passageway 156 shown in Figure 2.

It will be seen that whenever the plunger 140 is lifted from the position shown, the end of the slots 146 being in engagement with the pin 148, the spool 114 will be directly lifted to the same extent that the plunger 140 is lifted, the spring centering means 116 yieldably resisting such movement. If the plunger 140 be pushed downwardly from the position shown, the spring 144 will be compressed without necessarily causing the spool 114 to follow the movements of the plunger 140. The spool 114 will move down initially, however, until chamber 136 is cracked open to the pressure passageway 118, at which time pressure oil admitted to the chamber 136 will also be admitted to the cylinder 152 through the passageway 156. The piston 154 will thus exert an upward pressure on the spool 114 causing the valve as a whole to act as a pressure reducing valve and maintain in the chamber 136 a pressure which is dependent upon the degree of compression of the spring 144.

The construction of the end plates 22 and 32 may be similar to that disclosed in the copending application above referred to. The port 20 of the plate 22 communicates with a longitudinal passageway 158 which has lateral extensions 160 and 162 in register with the unloading passageway 106 and with the pressure passageway 96 respectively. The longitudinal passageway 158 also communicates with a relief valve 164 the opposite side of which connects to a port 166 which registers with the tank passageway 100. The plate 22 is blanked at the point registering with the tank passageway 98.

The plate 32 is provided with a longitudinal passageway 168 having lateral extensions 170, 172 and 174 which communicate with the unloading passageway 124, the tank passageway 121, and the tank passageway 120 respectively. There is also provided a fourth lateral extension 176 which communicates with a seepage drain passageway 178 extending through each of the three valves 26, 28 and 30 and registering with a blank portion of the end plate 22. The end plate 32 is blanked at the point where it registers with the pressure passageway 118.

In operation, with the parts in the position shown in the drawings, that is, with all valves in neutral position, the delivery of pump 10 is bypassed to tank through conduit 18, port 20, passageway 158, extension 160, passages 106, 108, 122 and 124, extension 170, passageway 168, port 34, and conduit 36. If it is desired to shift gears in the transmission 72, the handle 88 may be shifted upwardly, for example, to place chamber 104 in communication with the pressure passageway 96 and chamber 102 in communication with the tank passageway 100. The same movement blocks the unloading passageway for the pump at the passages 106 and 108 so that the full pump delivery passes from port 20 through passage 158, extension 162, pasage 96, chamber 104, port 40, and conduit 54 to the head end of cylinder 50. The piston 68 accordingly moves to the left discharging oil from the rod end of cylinder 50 through conduit 52, port 38, chamber 102, passageway 100, passage 120, extension 174, passage 168, port 34, and conduit 36 to tank. For opposite movement of the piston 68 valve spool 110 will, of course, be shifted downwardly which establishes the opposite connections to conduits 52 and 54.

If it is desired to engage the clutch 78, the operating handle 90 will be depressed causing the spool 114 to move downwardly, as previously described, blocking the unloading passageways 122 and 124 and admitting pressure oil to the port 42, line 58, and head end of cylinder 56. The piston 72 accordingly moves to the right until sufficient pressure is built up to cause the piston 154 to lift spool 114 to the point where chamber 136 is just closed off from communication with passageway 120. It will be seen that the pressure at which this action occurs depends upon the degree of compression of the spring 144 which gives the operator the same "feel" at the lever 90 as he would have if the lever were directly connected to the clutch 78 except that the force required at the lever 90 for full engagement is only a fraction of the force required at the lever 76. The force at the lever 90, however, is proportional to that exerted at the lever 76. The engagement of the clutch may thus be controlled with great nicety in accordance with operating conditions and requirements in exactly the same manner as if the clutch were operated by hand. The additional advantage is provided, however, that the force required for operating the clutch is greatly reduced.

If it is desired to release the clutch gradually the handle 90 may be merely permitted to move upwardly gradually to the central position thus permitting the piston 154 to lift the valve spool 114 against the reduced force of the spring 144 and opening the chamber 136 to the tank passageway 120. The inherent resilient force in the clutch 78 produced by its own release springs will under these conditions move the piston 72 to the left discharging oil through the conduit 58 to port 42 which is now connected to tank. Oil will also be drawn into the rod end of cylinder 56 through the conduit 60 under these conditions.

If it is desired to quickly release the clutch at a greater speed than occurs under the action just described, the lever 90 may be lifted upwardly past central position to not only connect chamber 136 to tank but also connect chamber 138 to the pressure passageway 96 and to block the unloading passages 122 and 124. Under these conditions the full capacity of the pump is available for moving the piston 72 to the left under oil pressure delivered through the conduit 60.

The operation of the valve 30 for controlling brake 86 is identical to that described in connection with the valve 28 and clutch 78 so that the action thereof will be obvious.

It will be seen that the present invention provides a power transmission system in which a clutch or brake may be precisely controlled as to its engagement by a lever having the same "feel" as a directly connected clutch or brake operating lever. This result is achieved through the use of a novel control valve so constructed as to permit of assembly with other similar valves into a valve bank capable of receiving any number or combination of control valves for operating such fluid motors as may be required from a single pressure pump.

Although the invention has been described in a form wherein each valve in the valve bank is provided with means for unloading the pump in response to operation of the various control valve spools, it will be understood that many advantages of the present invention may be derived without the use of this feature. The control valves 28 and 30 may be used in a valve bank wherein the end plate 22 is blanked at the unloading passageway 106 and wherein separate means are provided for unloading the pump when pressure oil is not required for the operation of the system. Customarily such unloading means are associated with an accumulator on the pressure line 18 together with an unloading valve responsive to the amount of oil in the accumulator or to the oil pressure therein, and which serves to unload the pump when the accumulator has been filled.

While the form of embodiment of the invention, as herein disclosed, constitutes a preferred form, it is to be understood that other forms might be adopted, all coming within the scope of the claims which follow.

What is claimed is as follows:

1. A manually operable pressure controlling valve comprising a housing having a longitudinal valve member recess with transverse pressure and exhaust passageways and a transverse motor port opening to said recess, a shiftable valve member in said recess and having lands for controlling communication of said motor port with said passageways, means responsive to pressure in said motor port for shifting the valve member in a direction tending to open the motor port to the exhaust passageway, a spring tending to shift the valve member in the opposite direction, and a manually operable plunger for controlling the force of the spring, said housing having transversely aligned pairs of openings in its opposite sides, each pair communicating with one of said passages and when mounted in a valve bank adjacent similar housings being adapted to register with similarly located openings to provide continuous passageways through the bank.

2. A manually operable pressure controlling valve comprising a housing having a longitudinal valve member recess with transverse pressure and exhaust passageways, an unloading passageway and a transverse motor port opening to said recess, a shiftable valve member in said recess and having lands for controlling communication of said motor port with said passageways, means responsive to pressure in said motor port for shifting the valve member in a direction tending to open the motor port to the exhaust passageway, a spring tending to shift the valve member in the opposite direction, and a manually operable plunger for controlling the force of the spring, said valve member having means for blocking the unloading passageway when the valve is shifted to open the motor port to the pressure passageway, said housing having transversely aligned pairs of openings in its opposite sides, each pair communicating with one of said passages and when mounted in a valve bank adjacent similar housings being adapted to register with similarly located openings to provide continuous passageways through the bank.

3. A manually operable pressure controlling valve comprising a body having a longitudinal valve member recess with pressure and exhaust passageways and motor ports opening to said recess, a shiftable valve member in said recess and having lands for controlling communication of said motor ports with said passageways, means responsive to pressure in said motor ports for shifting the valve member in a direction tending to open one motor port to the exhaust passageway and open the other motor port to the pressure passageway, a spring tending to shift the valve member in the opposite direction, and a manually operable plunger for controlling the force of the spring and having a lost-motion connection with the valve member for shifting the same past its center position in a direction to open said one motor port to the exhaust passageway and open the other motor port to the pressure passageway.

4. A manually operable pressure controlling valve comprising a body having a longitudinal valve member recess with pressure and exhaust passageways and motor ports opening to said recess, a shiftable valve member in said recess and having lands for controlling communication of said motor ports with said passageways, means responsive to pressure in said motor ports for shifting the valve member in a direction tending to open one motor port to the exhaust passageway and open the other motor port to the pressure passageway, a spring tending to shift the valve member in the opposite direction, a manually operable plunger for controlling the force of the spring and having a lost-motion connection with the valve member for shifting the same past its center position in a direction to open said one motor port to the exhaust passageway and open the other motor port to the pressure passageway, and additional spring means for normally holding the valve member in its center position.

5. A manually operable pressure controlling valve for controlling the operation of a fluid motor for operating a brake, clutch or the like comprising a housing having a longitudinal valve member recess with transverse pressure and exhaust passageways and a transverse motor port opening to said recess, a shiftable valve member in said recess and having lands for controlling communication of said motor port with said passageways, and a manually operable member for shifting said valve member and connected to the valve member for pressure controlled operation thereof in one direction of motor actuation and for direct mechanical operation in the opposite direction, said housing having transversely aligned pairs of openings in its opposite sides, each pair communicating with one of said passages and when mounted in a valve bank adjacent similar housings being adapted to register with similarly located openings to provide continuous passageways through the bank.

6. A manually operable pressure controlling valve for controlling the operation of a fluid motor for operating a brake, clutch or the like comprising a housing having a longitudinal valve member recess with transverse pressure and exhaust passageways and transverse motor ports opening to said recess, a shiftable valve member in said recess and having lands for controlling communication of said motor ports with said passageways, and a manually operable member for shifting said valve member and connected to the valve member for pressure controlled operation thereof in one direction of motor actuation and for direct mechanical operation in the opposite direction whereby the clutch or brake operating motor may be controlled with "feel" in said one direction and may be operated quickly at full capacity in the opposite direction, said housing having transversely aligned pairs of openings in its opposite sides, each pair communicating with one of said passages and when mounted in a valve bank adjacent similar housings being adapted to register with similarly located openings to provide continuous passageways through the bank.

7. A manually operable pressure controlling valve for controlling the operation of a double acting fluid motor for operating a brake, clutch or the like comprising a body having a longitudinal valve member recess with pressure and exhaust passageways and a pair of motor ports opening to said recess, a shiftable valve member in said recess and having lands for selectively transposing communication of said motor ports with said passageways, and a manually operable member for shifting said valve member and connected to the valve member for positive pressure controlled operation thereof in one direction of motor actuation and for direct mechanical operation in the opposite direction.

8. A manually operable pressure controlling valve for controlling the operation of a fluid motor for operating a brake, clutch or the like comprising a body having a longitudinal valve member recess with transverse pressure and exhaust passageways and transverse motor ports opening to said recess, a shiftable valve member in said recess and having lands for controlling communication of said motor ports with said passageways, and a manually operable member for shifting said valve member and connected to the valve member for positive pressure controlled operation thereof in one direction of motor actuation and for direct mechanical operation in the opposite direction whereby the clutch or brake operating motor may be controlled with "feel" in said one direction and may be operated quickly at full capacity in the opposite direction.

9. A manually operable pressure controlling valve for controlling the operation of a fluid motor for operating a brake, clutch or the like comprising a body member and a movable member together forming a four-way valve, spring centering means for normally holding the valve in neutral position, pressure controlled means for operating the valve away from neutral in one direction, and a single manually operable control member for adjusting the pressure controlled means when moved in one direction and for directly and mechanically operating the valve away from neutral in the opposite direction independently of pressure.

FERRIS T. HARRINGTON.
DUNCAN B. GARDINER.